Patented Dec. 4, 1951

2,576,932

UNITED STATES PATENT OFFICE

2,576,932

FERMENTATION PROCESS FOR PRODUCTION OF VITAMIN $B_{12}$

John A. Garibaldi, San Francisco, Kosuke Ijichi, Berkeley, and James C. Lewis, Oakland, Calif., and James McGinnis, Pullman, Wash., assignors to the United States of America as represented by the Secretary of Agriculture No Drawing. Application February 1, 1950, Serial No. 141,832

7 Claims. (Cl. 195—96)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to vitamin $B_{12}$ and has as its prime object the provision of methods for the production of this vitamin by the culture of a particular strain of *Bacillus megatherium*. Other objects of this invention will be apparent from the description herein.

Vitamin $B_{12}$ has recently been shown to be essential to animal life and is presently employed in the form of an injectable drug for pernicious anemia in humans and in the form of concentrates as a supplement in poultry and other animal feeds. Heretofore this vitamin has been isolated from natural sources such as liver or has been obtained as a byproduct in the manufacture of streptomycin or aureomycin.

It has now been found that a particular strain of *Bacillus megatherium* not heretofore known biosynthesizes the desired vitamin in yields much higher than with any other microorganism. Thus to prepare the vitamin it is only necessary to culture this organism on a suitable medium. For animal feeding purposes, the culture itself can be added to conventional feeds to introduce the desired concentration of vitamin $B_{12}$. If desired, the culture may be subjected to concentration as by evaporation or centrifugation to obtain more highly potent preparations. The culture or concentrates thereof can also be used as sources from which to isolate the vitamin in pure or injectable form.

The organism which we use is a hitherto unknown strain of *Bacillus megatherium* which was isolated by us from soil. A culture of this organism has been deposited in the Stock Culture Collection of the Northern Regional Research Laboratory, Peoria, Illinois, as No. B-938. There follows herewith a description of this particular organism:

I. Morphology:
  Vegetative cells (6 to 8 hours at 35° C. on nutrient agar): Rods 2.0 microns by 4.0 to 6.0 microns, non-motile, gram-variable, stained protoplasm appears foamy.
  Sporangia: Not swollen.
  Spores: 1.0 micron by 1.5 to 2.0 microns, oval, central, many spores after 18 hrs. at 35° C. but few after 18 hrs. at 25° C.

II. Cultural features:
  Nutrient agar slants: Growth abundant, smooth, glistening, opaque, non-adherent, creamy white, no browning with age, pellucid dots.
  Nutrient broth: Growth heavy but sedimented, no pellicle.
  Maximum temperature for growth: Growth at 42–44° C. but not at 46–48° C.

III. Biochemical features:
  Voges-Proskauer reaction: Negative.
  Fermentation tests: Acid without gas from arabinose, glucose, fructose, maltose, sucrose, mannitol, mannose, and raffinose. Slight acid with xylose and galactose. No acid with lactose and cellobiose.
  Starch hydrolysis: Positive.

The culture of the particular strain of *B. megatherium* may be carried out in many alternative ways. For example, the bacillus may be cultured by a surface technique using a quiescent pool of nutrient medium and allowing the organism to grow in the medium and as a sediment. Further, a shake technique may be employed wherein the inoculated medium is placed in flasks which are subjected to continuous shaking so as to obtain constant exposure of the medium to air. In general, however, we prefer to use a submerged type of culture as giving the highest yields together with efficiency and economy of operation. In carrying out such type of culture, the sterilized medium is placed in a vessel, inoculated with the *B. megatherium* and then air is continuously forced into inoculated medium while it is subjected to agitation. Under such conditions the cells are dispersed throughout the medium and are kept in intimate contact with the air and with the nutrients present in the medium.

The culture of B. *megatherium* B-938 is generally stored in nutrient agar slants. For preparing inoculum for submerged culture, transplants are usually made into shallow layers of experimental media in Erlenmeyer flasks and incubated at 25° C. to 35° C. for 48 hours using a shake technique. The contents of the flasks are then thoroughly agitated and 50-100 ml. of the resulting suspension used to inoculate 1 liter of culture medium. It was found that the amount of inoculum is not critical. The inoculum can also be prepared on a small scale under submerged conditions according to the process herein disclosed. High yields of vitamin $B_{12}$ in the shortest time can be produced if the inoculum is grown under submerged conditions on the same medium as the culture to be employed in vitamin $B_{12}$ production and the inoculation carried out at the point where the cell production is at a maximum in the inoculum culture.

In carrying out the process of this invention under the preferred technique of submerged conditions, many types of apparatus can be used. The essentials to be provided are a vessel equipped with stirring device and means for introducing air during the run and means for cooling or heating the contents of the vessel. Many refinements may be added such as thermometers, sampling devices, inlets for introducing materials, mechanical foam breakers, and so forth. It is preferable to employ some stirring or agitating device to disperse the air entering the system with the medium. Such device may be a mechanical agitator, for example. Further, it is possible to utilize the air entering the system for agitation as well as for the metabolism of the organism. For this purpose air may be introduced through orifices whereby turbulence of the culture will be obtained. Another method of providing agitation is to continuously circulate the culture medium through a pump. In such case the air may be introduced directly into the pump or into the pump line whereby it will be thoroughly dispersed with the culture medium.

During submerged culture excessive foaming is sometimes encountered. This can be controlled by adding a chemical de-foaming agent or by mechanical devices. Commercial de-foaming agents suitable for this purpose are available on the market. A suitable example is a monoglyceride dissolved in lard oil; another is octadecanol, which, for convenience in adding small quantities thereof, may be diluted with purified mineral oil (liquid petrolatum) or lard oil. Mechanical foam breakers such as disclosed by Humfeld (Jour. Bacteriology, vol. 54, p. 689) may be used instead of chemical means.

In culturing B. *megatherium* by any technique, air must be available to the organism. In culturing under submerged conditions, air must be actually introduced into the culture. It is most convenient to introduced the air at the bottom of the fermentation vessel through a sparger or other mechanical device to break up the air into fine bubbles. Usually an excess of air is provided to supply air for growth and to act as an agitating means. Thus the volume of air introduced may be from about 0.1 to about 2 liters per minute per liter of medium.

In general, the culture of B. *megatherium* is harvested when the vitamin $B_{12}$ in the culture is at a maximum. This point can be determined by assaying a pilot culture at intervals. However, it is preferred to determine this maximum point indirectly by periodically determining the extent of growth in the culture. This can readily be accomplished by withdrawing small samples of the culture and centrifuging them whereby the cellular material will settle to the bottom of the centrifuge tube and the ratio of liquid to cellular material can thus be readily ascertained. It has been observed that production of vitamin $B_{12}$ lags somewhat behind cell production. Therefore to obtain the maximum yield of the vitamin, the culture is incubated for 1 to 2 hours after maximum cell production is reached and then the culture is harvested.

The B. *megatherium* organism may be cultured in many different media. In essence, the medium must contain, besides water, (1) a source of energy, (2) a source of nitrogen, and (3) suitable minerals.

The source of energy may be a carbohydrate as, for example, sucrose, dextrose, fructose, maltose, starch, and so forth. Instead of carbohydrates, polyhydric alcohols may be used, as, for example, glycerol, mannitol, sorbitol, and so forth. Of course, some of these energy sources are more readily utilized by the bacillus and hence higher yields are produced under otherwise identical conditions. Thus we prefer to use sucrose or dextrose as being low in cost and yet productive of the highest yields. The concentration of the energy source should be enough to provide sufficient nutrient for good growth of the organism; in general, concentrations from about 5% to about 20% can be used. Usually however, it is preferred to use a lower concentration, say from 1% to 5% and add additional amounts of the energy material as the culture proceeds and as the material is used up. Of course it is not essential to use purified, individual compounds as the source of energy. Thus one may employ corn sugar, corn syrup, invert sugar, beet or cane molasses, or media made by cooking cereals in water. Suitable cereals are for example corn, wheat, oats, barley, malted barley, rice, etc. If desired the cereal wort can be subjected to complete or partial saccharification with a diastatic enzyme to render the energy material more readily assimilable.

The source of nitrogen may be an organic or inorganic nitrogen derivative. In the organic category may be mentioned proteins, hydrolyzed proteins, enzyme-digested proteins, amino acids, yeast extract, asparagin, and urea. For reasons of economy it is usually preferable to employ an inorganic compound such as ammonia, ammonium hydroxide, or salts thereof such as ammonium phosphate, ammonium citrate, ammonium acetate, ammonium sulphate, ammonium nitrate, and so forth. In general, the concentration of nitrogen should be from about 0.075 to 1%. No deleterious effect is caused by adding more than 1%. A very convenient method of supplying nitrogen is to add ammonium hydroxide periodically during the course of the culture. In this way the pH of the culture can be kept constant and the requisite nitrogen is supplied. For this purpose ammonia gas also can be bubbled directly into the culture.

In addition to the energy and nitrogen sources, mineral nutrients are also required for the medium. Thus potassium, sulphur and phosphorus are required. These elements may be supplied in the form of their salts. Thus the potassium may be supplied as potassium chloride, phosphate, sulphate, citrate, acetate, nitrate, and so forth. Sulphur and phosphorus are supplied in the form of sulphates or phosphates such as alkali metal or ammonium sulphates and alkali metal or ammonium phosphates. These elements, potassium, sulphur, and phosphorus, are generally added to the medium in a concentration of from about 100 to about 1,000 P. P. M. of each. (The abbreviation "P. P. M." used herein means parts per million.) In addition, the following minerals are required in trace amounts (from about 1 to about 100 P. P. M. of each): zinc, iron, manganese, magnesium, calcium, and cobalt. In preparing media from refined materials such as chemically-pure sugar and ammonium salts it is essential to add these trace elements. However, where the medium is made from technical-grade materials such as beet or cane molasses, asparagus juice, worts from cereals and so forth, then trace elements are usually already present. However, since cobalt is a constituent of vitamin $B_{12}$, it is always essential that there be a sufficient concentration of this element in the medium. Hence even where technical materials are used it is advisable to add a trace of cobalt, so that the total concentration of cobalt will be in the range from about 1 to about 100 P. P. M. If trace elements are to be deliberately added to the medium one can use any suitable salt thereof such as the chlorides, sulphates, nitrates, and so forth.

The addition of citric acid or other organic acid (or water-soluble salt thereof such as the alkali metal or ammonium salt) to the medium is often beneficial to act as a buffer and to keep the various salts in solution. Citric acid is especially beneficial where the concentration of iron, magnesium, calcium, or phosphorus is too high due, for example, to impurities in the materials used. Thus an addition of from about 0.05% to about 0.5% citric acid gives good results. Instead of using purified citric or other organic acid one can use materials containing the same or similar acids such as asparagus juice, alfalfa juice, beet molasses, Steffen's waste liquor and other agricultural materials of this type.

The pH of the culture may vary from about 5.5 to about 7.5. If the pH is not controlled during the fermentation, the pH will drop as the organism reproduces. Hence it is preferable to keep the pH within the stated range during the entire run. This can be accomplished by using a buffer. For example, phosphoric acid, citric acid, or other weak organic acid may be added to the culture either as such or in the form of their water-soluble salts, i. e., their sodium, potassium, or ammonium salts. Another method of controlling the pH is to add an alkaline material in small portions as the run proceeds. For this purpose one may use the hydroxides of sodium, potassium, or ammonium, or ammonia gas. As set forth above, ammonium hydroxide or ammonia are preferred for this purpose as they not only serve to regulate the pH but are also nutrients for the organism.

The temperature of the culture can be varied from about 25° C. to about 40° C. Since the rate of growth of the organism increases as the temperature is raised, it is preferred to use a temperature from about 35° C. to about 40° C. In maintaining proper temperature levels it is usually necessary to heat the system during early stages of growth whereas as the culture proceeds it will be observed that heat is generated in the culture and hence cooling will be required to keep the culture at the desired temperature. Thus in working up large batches it is preferred to use a vessel which is equipped with a jacket or coil into which can be introduced a heating or a cooling medium by suitable control of valves and so forth.

Vitamin $B_{12}$ can be produced in a continuous manner by proceeding in the following way: A medium is prepared containing water, the mineral nutrients, citric acid if necessary, and small amounts of the energy source and the nitrogen source. These latter two components are added only in sufficient quantity to enable initial growth to proceed. The medium is sterilized, cooled, then inoculated and culturing started under the conditions set forth. Then, as the culturing proceeds, additional source of energy and source of nitrogen are added as required for the growth of the organism and production of vitamin $B_{12}$. Part of the culture is withdrawn from time to time for utilization.

The culture of *B. megatherium* containing vitamin $B_{12}$ and produced in accordance with this invention may be utilized in many ways. For example, the entire culture may be mixed thoroughly and incorporated with an animal feed to supply the requisite concentration of vitamin $B_{12}$. If desired the entire culture may be dried, or it may be concentrated as by evaporating preferably under vacuum and the resulting concentrate used as a feed supplement. Another method of concentrating is to subject the whole culture to centrifugation, decantation, or filtration to separate the cellular material which contains essentially all of the vitamin $B_{12}$ content. This cellular material may then be used as a feed supplement or may be further concentrated as by subjecting it to evaporation. If the whole culture is subjected to heat—as for instance heating to 100° C. until the cells are autolyzed, the vitamin $B_{12}$ is transferred to the supernatant liquid. Thus if the heated culture is then subjected to centrifugation, filtration, or decantation to remove the cellular material, the vitamin $B_{12}$ will be found in the clear liquid. This liquid can be used as a source material for the preparation of pure or injectable vitamin $B_{12}$. The preparations containing vitamin $B_{12}$ produced in accordance with this invention are heat-stable. Thus when the whole culture is heated to evaporate it or to effect an autolysis, the vitamin content is not adversely affected. Tests have shown that the culture can be subjected to steam at 15 lbs./sq. in. gauge pressure (250° F.) for as high as 20 minutes with only slightly loss (less than 10%) of vitamin $B_{12}$.

The following examples demonstrate the invention in greater detail. It is understood that these examples are given only by way of illustration and not limitation.

In these examples the preparations were assayed for vitamin $B_{12}$ activity by a modification of the method of Skeggs et al. (Jour. Biol. Chem., vol. 176, p. 1459). Ascorbic acid (0.1%) was added to the assay medium as was recommended by Stokstad et al. (Fed. Proc., vol. 8, p. 257). In these assays the samples were assayed against a standard sample of crystalline vitamin $B_{12}$ using *Lactobacillus leichmannii* (ATCC 4797) as the test organism. Vitamin yields are expressed in micrograms per liter as determined against this standard.

The dry weight of the bacterial cells produced was determined by centrifuging a sample of the culture, pouring off the supernatant liquid, resuspending the cell cake in water for the purpose of washing the cells, recentrifuging the cells and drying the cell cake. Quick estimations of the progress of growth may be obtained by measuring the volume of the cell cake by the use of a graduated centrifuge tube, or by measuring the turbidity of a suitably diluted sample of the culture.

EXAMPLE I

A medium was prepared by dissolving the following materials in water in the concentrations set forth below:

| Material | Concentration |
|---|---|
| | G./liter |
| $Na_2SO_4$ | 2.0 |
| $(NH_4)_2HPO_4$ | 4.25 |
| sucrose | 50.0 |
| citric acid | 0.5 |
| yeast extract | 2.5 |
| KCl | 0.76 |

In addition to these materials the chlorides of zinc, iron, manganese, magnesium, and cobalt were added to furnish:

Zn and Fe _____ 5 P. P. M. of each
Mn _____ 15 P. P. M.
Mg _____ 50 P. P. M.
Co _____ 2 P. P. M.

Twelve liters of this medium was adjusted to pH 7.0 by addition of ammonium hydroxide and then placed in a fermentor such as that described by Humfeld in Jour. Bact., vol. 54, page 689. The fermentor was placed in a steam-heated autoclave and sterilized at a steam pressure of 15 lbs./sq. in. for 45 minutes. The fermentor was then removed from the autoclave, allowed to cool and the medium inoculated with a culture of *B. megatherium* B–938. The submerged culture was then started by continuously agitating the culture and passing air through it at the rate of about 10 liters per minute. The fermentor was surrounded by a water jacket whereby the temperature of the culture was maintained at substantially 30–35° C. during the run. At half-hour intervals, 5% aqueous ammonium hydroxide was added in sufficient quantity to maintain the pH in the range 6.5–7.0, in all 39 g. of nitrogen being added. Further, additional carbohydrate was supplied by adding five 100-gram lots of sucrose at 45 minute intervals starting when the culture had progressed for 8 hrs., 45 min. The data obtained are shown in the following table:

Table 1

| Time, hours | pH | Dry weight of bacterial cells | Vitamin $B_{12}$ in culture |
|---|---|---|---|
| | | Grams/liter | Micrograms/liter |
| 0 | | | |
| 3 | 6.9 | 1.4 | 13 |
| 4 | 6.5 | 2.8 | 27 |
| 5 | 6.7 | 5.7 | 49 |
| 6 | 6.7 | 7.0 | 56 |
| 7 | 6.9 | 13.2 | 70 |
| 8 | 6.7 | 15.4 | 115 |
| 9 | 6.5 | 22.1 | 157 |
| 10 | 6.6 | 30.0 | 335 |
| 11 | | 32.5 | 500 |
| 12 | 6.7 | 39.0 | 633 |
| 13 | 7.3 | 39.5 | 775 |

EXAMPLE II

A medium was prepared by dissolving the following materials in water in the concentrations set forth below:

| Material | Concentration |
|---|---|
| | Grams per liter |
| $Na_2SO_4$ | 2.0 |
| $(NH_4)_2HPO_4$ | 8.0 |
| beet molasses (50% sucrose) | 125 |
| KCl | 0.76 |

In addition to these materials the chlorides of zinc, iron manganese, magnesium, and cobalt were added to furnish:

Zn and Fe _____ 5 P. P. M. of each
Mn _____ 50 P. P. M.
Mg _____ 50 P. P. M.
Co _____ 2 P. P. M.

Twelve liters of this medium, which was at pH 7.0, was fermented as described under Example I. The amount of ammonium hydroxide added during the fermentation serves as a measure of the extent of growth. The data obtained are shown in the following table:

Table 2

| Time, hours | pH | Ammonium hydroxide addition, expressed as grams of nitrogen | Vitamin $B_{12}$ in culture |
|---|---|---|---|
| | | | Micrograms per liter |
| 4 | 6.7 | 2 | |
| 6 | 6.5 | 4 | 145 |
| 7 | 6.1 | 10 | 255 |
| 8 | 6.0 | 8 | 315 |
| 9 | 7.4 | 2 | 400 |
| 10 | | 0 | 425 |
| 11 | 7.1 | 0 | 455 |
| 12 | | 0 | 455 |

EXAMPLE III (A) A medium was prepared by dissolving the following materials in water in the concentrations set forth below:

| Material | Concentration |
|---|---|
| | G./liter |
| $Na_2SO_4$ | 2.0 |
| $(NH_4)_2HPO_4$ | 2.13 |
| citric acid | 5.85 |
| sucrose | 50 |

In addition to these materials, the chlorides of potassium, iron, manganese, magnesium, cobalt, and calcium were added to furnish:

K _____ 400 P. P. M.
Zn and Fe _____ 5 P. P. M., each
Mn _____ 15 P. P. M.
Mg _____ 50 P. P. M.
Co _____ 2 P. P. M.
Ca _____ 20 P. P. M.

This medium was adjusted to a pH of 7.0 by addition of ammonium hydroxide then sterilized. 80 ml. of the sterile medium was placed in a 250 ml. flask, inoculated with *B. megatherium* B–938, and cultured at 30° C. for 6 days on a shaking machine. The culture was found to contain 102 micrograms/liter of vitamin $B_{12}$.

(B) The experiment set forth in part A was repeated substituting different sugars for the sucrose. The concentration of sugar and other nutrients and the conditions of the culture were the same as in part A. The results obtained are set forth in the following table:

Table 3

| Exp. | Sugar used | Vitamin $B_{12}$ in culture |
|---|---|---|
| | | Micrograms per liter |
| 1 | dextrose | 148 |
| 2 | maltose | 143 |

EXAMPLE IV

Ten and one-half liters of a culture produced as set forth in Example I (vitamin $B_{12}$ content, 803 micrograms/liter) was concentrated under vacuum at a temperature of 30° C. The syrupy liquid concentrate had a total weight of 2.15 kg. and a vitamin $B_{12}$ content of 3200 micrograms per kg.

EXAMPLE V

A culture produced by a shake technique (vitamin $B_{12}$ content, 150 micrograms per liter) was divided into samples. Each of these samples was treated separately as follows:

A. One liter of the culture was subjected to centrifugation to separate the cellular matter from the liquid. The liquid obtained was found to contain but 26 micrograms of vitamin $B_{12}$. The washed bacterial cells were found to contain 105 micrograms of vitamin $B_{12}$.

B. Another liter of the culture was placed in an autoclave and heated to 100° C. for 20 minutes. The heat-treated culture was then centrifuged. In this case the liquid fraction had a vitamin content of 151 micrograms per liter. The washed bacterial cells were found to contain 3 micrograms of vitamin $B_{12}$.

EXAMPLE VI

A culture of *B. megatherium* B-938 was grown substantially as described in Example I, except that a total of 500 grams of sucrose was used. The culture was harvested after 28 hrs. of aeration, although growth was complete after 7 hrs. The culture, which contained 18 grams of bacterial cells per liter of culture, was concentrated under vacuum to give a syrup. This syrup assayed 1.9 micrograms of vitamin $B_{12}$ per gram of syrup by microbiological assay, and was used as a vitamin $B_{12}$ supplement for growing chicks as described next.

Fourteen pens of 15 chicks each were selected from vitamin $B_{12}$-deficient chicks newly hatched from eggs laid by hens on a vitamin $B_{12}$-limited ration. Each pen of chicks was fed ad libitum for 3 weeks on the following basal diet:

| Ingredient | Per cent of ration |
|---|---|
| Ground yellow corn | 36 |
| Soybean oil meal (44% protein) | 52 |
| Alfalfa | 5.0 |
| Brewer's yeast | 2.0 |
| Riboflavin concentrate (500 micrograms) | 0.25 |
| Feeding oil (2000 units of vitamin A and 800 units of vitamin D) per gram | 0.25 |
| Ground limestone | 2.0 |
| Dicalcium phosphate | 1.9 |
| Sodium chloride | 0.50 |
| Choline chloride | 0.10 |
| Manganese sulfate | 0.019 |

Supplements were added to the ration fed to certain pens of chicks as indicated below. The average weights of the surviving chicks were determined after 3 weeks. The following results were obtained:

Table 4

| Pen No. | Supplement | Amount of supplement, grams per 100 grams of ration | Vitamin $B_{12}$ furnished by the supplement, micrograms per 100 grams of ration | Average weight at 3 weeks, grams |
|---|---|---|---|---|
| 1 | none | | | 118 |
| 2 | none | | | 106 |
| 3 | Alcohol soluble liver fraction | 0.20 | 3.8 | 170 |
| 4 | do | 0.20 | 3.8 | 182 |
| 5 | *B. megatherium* culture concentrate | 0.10 | 0.19 | 182 |
| 6 | do | 0.10 | 0.19 | 141 |
| 7 | do | 0.20 | 0.38 | 140 |
| 8 | do | 0.20 | 0.38 | 134 |
| 9 | do | 0.40 | 0.76 | 164 |
| 10 | do | 0.40 | 0.76 | 172 |
| 11 | do | 0.80 | 1.52 | 166 |
| 12 | do | 0.80 | 1.52 | 172 |
| 13 | do | 1.00 | 1.90 | 171 |
| 14 | do | 1.00 | 1.90 | 175 |

Having thus described our invention, we claim:

1. A process for preparing vitamin $B_{12}$ which comprises incubating under aerobic conditions a nutrient medium inoculated with a vitamin $B_{12}$-producing strain of *Bacillus megatherium*.

2. A process for preparing vitamin $B_{12}$ which comprises establishing a nutrient medium comprising water, a carbohydrate, and an ammonium salt, inoculating said medium with a vitamin $B_{12}$-producing strain of *B. megatherium*, and incubating the resulting culture under aerobic conditions whereby vitamin $B_{12}$ is biosynthesized by the organism.

3. The process of claim 2 wherein the carbohydrate is sucrose.

4. A process for preparing vitamin $B_{12}$ which comprises establishing a nutrient medium comprising water, mineral salts, a carbohydrate, and an ammonium salt, inoculating said medium with a vitamin $B_{12}$-producing strain of *B. megatherium*, incubating the resulting culture under agitated, aerated, submerged conditions, and harvesting the culture several hours after maximum growth is obtained.

5. A process for preparing vitamin $B_{12}$ which comprises establishing a nutrient medium comprising water, mineral salts, a sugar, and an ammonium salt at a pH from about 5.5 to about 7.5, inoculating said medium with a vitamin $B_{12}$-producing strain of *B. megatherium*, incubating the resulting culture under agitated aerated, submerged conditions and adding ammonium hydroxide during the incubation to keep the pH essentially constant and to supply nitrogen for the growth of the organism.

6. A process for preparing vitamin $B_{12}$ which comprises incubating under aerobic conditions a nutrient medium inoculated with a vitamin $B_{12}$-producing strain of *Bacillus megatherium* whereby vitamin $B_{12}$ is biosynthesized by the organism, and recovering the vitamin $B_{12}$.

7. A process for preparing vitamin $B_{12}$ which comprises establishing a nutrient medium comprising water, mineral salts, sucrose, and an ammonium salt at a pH of from 5.5 to about 7, inoculating said medium with a vitamin $B_{12}$-producing strain of *B. megatherium*, incubating the resulting culture at a temperature from about 25° C. to about 40° C. under agitated, aerated, submerged conditions whereby vitamin $B_{12}$ is biosynthesized by the organism, harvesting the culture several hours after maximum growth is obtained, and recovering the vitamin B₁₂.

JOHN A. GARIBALDI.
          KOSUKE IJICHI.
          JAMES C. LEWIS.
          JAMES McGINNIS.

REFERENCES CITED

The following references are of record in the file of this patent:

UNITED STATES PATENTS

| Number | Name | Date |
|---|---|---|
| 2,202,161 | Miner | May 28, 1940 |
| 2,223,501 | Torrington | Dec. 3, 1940 |
| 2,326,425 | Arzberger | Aug. 10, 1943 |
| 2,447,814 | Novak | Aug. 24, 1948 |
| 2,491,927 | Martin | Dec. 20, 1949 |

OTHER REFERENCES

Gershenfeld: "Bacteriology," Mack Pub. Co., Easton, Pa., 1945.

Smith: "Nature," 161, April 24, 1948, pages 638, 639.

Stokstad: Jour. Lab. & Clinical Med., 33, 7, July 1948, pages 860–864.

Rickes et al.: "Science," December 3, 1948, vol. 108, pages 634–635.